(12) United States Patent
Salsburey (10) Patent No.: US 10,197,026 B2
(45) Date of Patent: Feb. 5, 2019

(54) MULTIPOSITIONAL FILTER ATTACHMENT

(71) Applicant: Kuss Filtration Inc., Findlay, OH (US)

(72) Inventor: Scott A Salsburey, Ottawa, OH (US)

(73) Assignee: Kuss Filtration Inc., Findlay, OH (US)

( * ) Notice: Subject to any disclaimer, the term of this patent is extended or adjusted under 35 U.S.C. 154(b) by 699 days.

(21) Appl. No.: 14/807,388

(22) Filed: Jul. 23, 2015

(65) Prior Publication Data
US 2016/0025050 A1    Jan. 28, 2016

Related U.S. Application Data

(60) Provisional application No. 62/028,997, filed on Jul. 25, 2014.

(51) Int. Cl.
| | | |
|---|---|---|
| *B01D 35/027* | (2006.01) | |
| *F02M 37/22* | (2006.01) | |
| *B01D 35/00* | (2006.01) | |
| *B01D 35/26* | (2006.01) | |
| *F02M 37/10* | (2006.01) | |

(52) U.S. Cl.
CPC .......... *F02M 37/22* (2013.01); *B01D 35/005* (2013.01); *B01D 35/0273* (2013.01); *B01D 35/26* (2013.01); *B01D 35/027* (2013.01); *F02M 37/10* (2013.01); *F02M 2037/228* (2013.01)

(58) Field of Classification Search
None
See application file for complete search history.

(56) References Cited

U.S. PATENT DOCUMENTS

| | | |
|---|---|---|
| 2003/0019907 A1 | 1/2003 | McGaw, Jr. |
| 2004/0140257 A1 | 7/2004 | Dockery et al. |
| 2012/0248021 A1 | 10/2012 | Schnipke et al. |
| 2013/0284662 A1 | 10/2013 | Ueki |

FOREIGN PATENT DOCUMENTS

| | | | |
|---|---|---|---|
| JP | 03-105054 A | * | 5/1991 |
| JP | 2011/163131 A | | 8/2011 |
| JP | 2012-112333 A | * | 6/2012 |

OTHER PUBLICATIONS

International Search Report for PCT/US2015/041768, dated Oct. 30, 2015.

* cited by examiner

*Primary Examiner* — Thomas M Lithgow
(74) *Attorney, Agent, or Firm* — Brinks Gilson & Lione (57) ABSTRACT

The present invention provides one filter with multiple retention locations integrated into a plastic connector that is attached to the filter for connecting the filter to a pump inlet by means of a retention post. A sock style filter is disclosed that incorporates a channel or a flat tab in the periphery of the plastic outlet port for providing a finite or infinite number of locations for retention of a post on a pump or other connection to allow for multiple alignment positioning of the filter with respect to the mating parts such as the pump body, fuel pump assembly, module can or fuel tank.

20 Claims, 14 Drawing Sheets

MULTIPOSITIONAL FILTER ATTACHMENT

CROSS-REFERENCE TO RELATED APPLICATIONS

This application claims the benefit of U.S. Provisional Patent Application Ser. No. 62/028,997 filed on Jul. 25, 2014, entitled "MULTI-POSITIONAL FILTER ATTACHMENT", the entire contents of which are incorporated herein by reference.

TECHNICAL FIELD

The present disclosure relates generally to in-tank filters for installation on in-tank pump assemblies, and more particularly relates to a connector on an in-tank fuel filter having multi-positional utility to assemble and position the filter in any one of multiple orientations with respect to the connecting unit such as to a retention post on the fuel pump.

BACKGROUND

This disclosure relates generally to in-tank filters, e.g. fuel filters for installation into a fuel system. In a fuel system, the conventional sock style in-tank fuel filter is comprised of filtration media and a connector that attaches the filter to a fuel pump. The filtration media is formed into a sock structure and used for filtering or removing contamination from a fuel or other liquid. The liquid that flows through a sock style filter is most often directionally flowing from the outside of the filter to the inside. Attached to a portion of the filtration media is a metal or plastic connector that is used to attach the filter to the fuel pump or other suction flow apparatus. Multiple fuel pump designs are used in the automotive field, with some fuel pumps having a retention post or pin that is cast, molded or assembled onto the end plate of the pump. The retention post typically extends outwardly and is located beside the fluid inlet port of the pump. This retention post is used to affix and locate the fuel pump onto the connector located on the filter. The connector of the filter will usually fit up to the post with an interference fit to ensure the filter does not fall off during transportation, installation or operation. The connector of the filter may or may not have a metal swell ring attached around the outlet of the filter to maintain a press fit with the inlet of the fuel pump. U.S. Pat. Nos. 5,665,229 and 8,715,497 reference the current state of the art and are incorporated herein by reference in their entirety.

SUMMARY

The present disclosure eliminates the additional costs of producing several filters each with a different inlet port and retainer orientation by providing one filter with multiple plastic retainer locations integrated into a plastic port that is attached to the filter for connecting the filter to a pump inlet.

In one embodiment, a sock style filter includes a connector with a recessed channel spanning a full radial circle around the outlet opening of the filter that allows for infinite locating of the retention post of the pump into the plastic molded connector of the filter. This recessed channel functions as the locating lug or hole through which the retention post of the pump attaches. In other variations, the recessed channel may span less that 360 degrees, but preferably greater than 45 degrees, to provide multiple locations of the retention post, and hence multiple positions of the filter media relative to the pump. In further variations, the recessed channel may be stepped, i.e. have multiple diameters at different heights to accommodate differently sized retention posts.

In a second embodiment, a sock style filter includes a plastic molded connector with multiple slots or pockets around the outlet of the filter resembling the spokes of a wheel to provide multiple finite locating of the retention post of the pump into the plastic molded connector of the filter. The finite slot functions as the locating lug or hole through which the retention post of the pump attaches.

For ease of assembly, the recessed channel or slots may have a funnel-like, for example frustoconical, wall to function as a centering guide at initial post to connector engagement from which the retention post is inserted into the channel or slot. A ridge may also be located on either or both walls of the channel to provide additional interference with the retention post for more force in holding the post.

A third embodiment uses a tab and retainer design unitarily formed around the periphery of the outlet port with multiple tabs having aperture holes for securing the retention post of the pump at any one of several radial aperture attachment positions around the outlet port. These aperture holes serve to locate the filter to the body of the fuel pump and act as the retention feature to secure the filter to the body of the fuel pump by grasping onto the retention post of the fuel pump.

In any of the filter embodiments, an anti rotational positioning tab may be molded or otherwise attached to the connector (or stack) to provide a means of positioning the filter to a location or reference point. This reference point may be to align the aperture holes of the connector to the body of the filter or to the connecting unit such as the body of the fuel pump, module can or fuel tank. This anti rotational positioning tab provides a means to align the body of the filter in the required direction with respect to the body of the fuel delivery module and position in the fuel tank.

The embodiments according to the foregoing provide a filter that can be used in any one of multiple orientations with respect to the pump's retention post and provides flexibility to utilize one filter design for multiple orientations of the fuel pump with respect to the body of the fuel delivery module and the position in the fuel tank. The plastic connector on the filter serves to grip and secure the filter to the pump retention post. This secure attachment is necessary to ensure the filter does not become detached from the pump during assembly, packaging and use. An anti rotational positioning tab located on the filter serves to locate the filter to a datum location in the system.

DETAILED DESCRIPTION

All figures serve illustrative purposes only and are not intended to limit the scope of the present invention. The drawings are generally to scale, but some features may not be true to scale and serve to emphasize certain details of the various aspects of the invention. Common items between different embodiments in the figures have common reference numerals.

Figure 1:
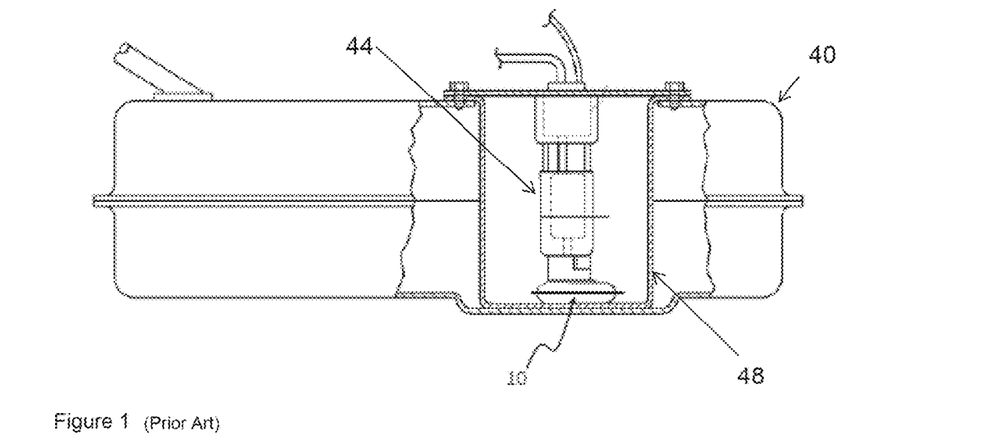
FIG. 1 is a diagrammatic, side elevation view of a motor vehicle fuel tank having a fuel pump assembly that can incorporate the sock style filter described herein.

FIGS. 1-4 generally depict prior art designs of sock style filters for fuel tanks. FIG. 1 shows a side view of a motor vehicle fuel tank having a fuel pump assembly 44 with an attached filter 10 located inside a module can 48, and collectively located inside the fuel tank 40. In some design configurations for in-tank liquid delivery systems, the module can 48 is eliminated and the filter 10 is located directly in contact with the fuel tank 40.

Figure 2:
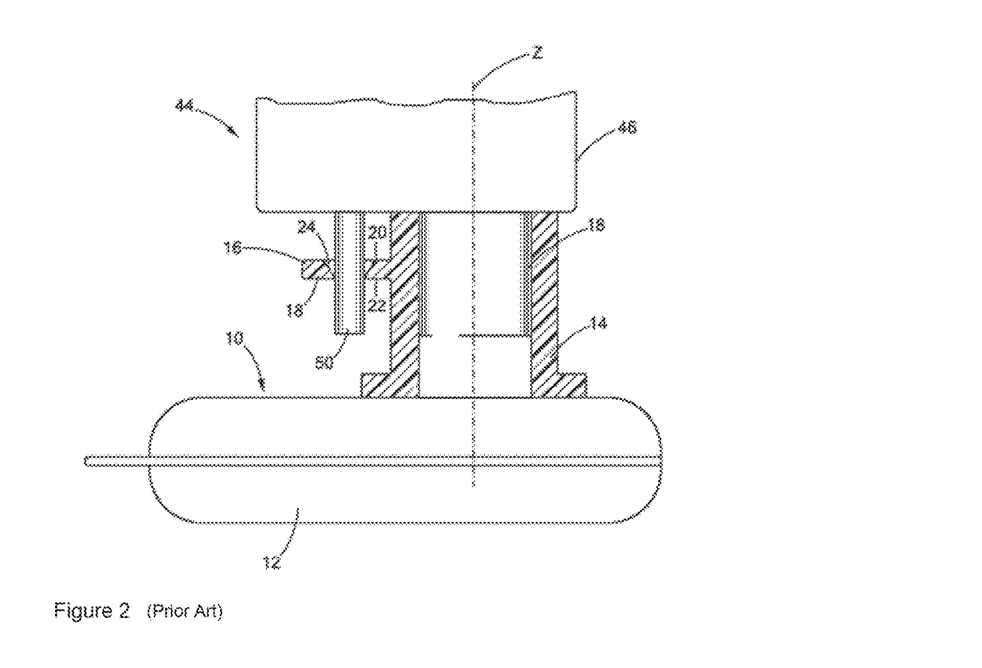
FIG. 2 is an enlarged, fragmentary sectional view of the current art.

FIG. 2 shows a schematic view of a fuel pump assembly 44 that includes a fuel pump 46, the cylindrical inlet fitting 18, and a retention post 50. The filter 10 has a filter body 12, an outlet port 14 attached to the filter body 12, and a retainer 16 unitarily formed on the outlet port 14. The filter body 12 includes filtration media for filtering contaminants from the fuel (or other liquids), and is preferably a sock style filter body 12. The cylindrical inlet fitting 18 extends from the fuel pump 46 toward the filter 10 and defines a central flow axis Z indicating a general direction along which fuel flows from the filter 10 through the inlet fitting 18 into the fuel pump 46.

The retention post 50 is in a fixed position radially with respect to the body of the fuel pump 46. The retainer 16 is in a fixed position radially with respect to the filter body 12. Therefore, the orientation of the filter body 12 to the fuel pump body 46 is fixed by the location of the retention post 50 to the retainer 16. The term "radially" indicates a position arranged around the central flow axis Z. The filter body 12 is made of a porous woven or non-woven textile envelope filled with a suitable filter medium for filtering fuel. The retention post 50 is preferably cylindrical and is secured to the bottom portion of the fuel pump 46. The retention post 50 extends parallel to the flow axis Z, spaced from the inlet fitting 18. This fixed positioning between the retention post 50 and the retainer 16 set the positioning of the filter body 12 with respect to the fuel pump 46. When the fuel pump 46 is assembled to the fuel pump assembly 44 the radial location of the fuel pump 46 is fixed with respect to the fuel tank 40.

Figure 3:
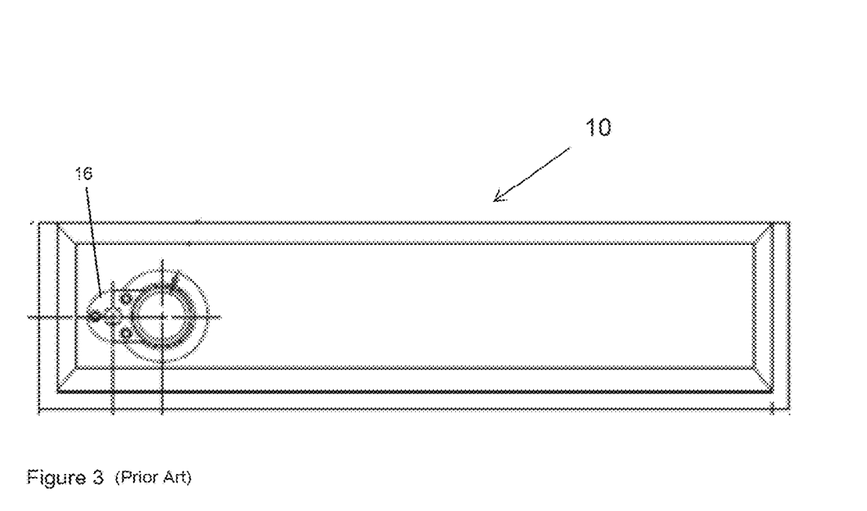
FIG. 3 is a pictorial view of a sock style filter with the pump post attachment hole positioned parallel with the body of the filter.
Figure 4:
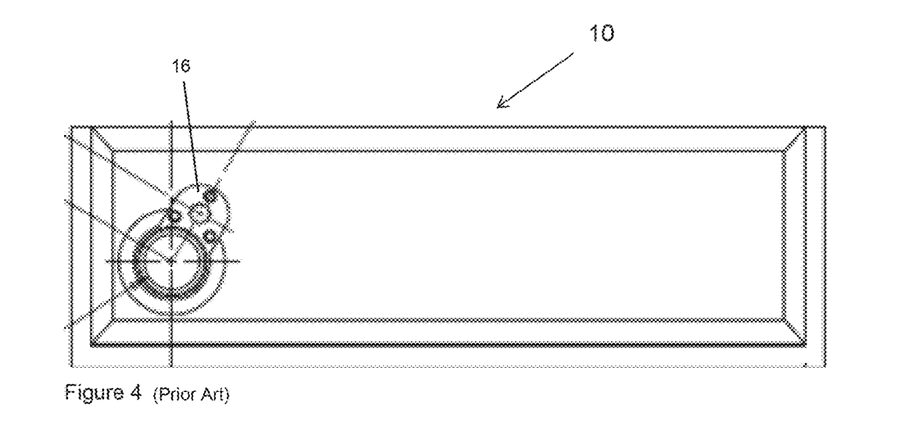
FIG. 4 is a pictorial view of a sock style filter with the pump post attachment hole positioned 120 degrees to the body of the filter.

FIGS. 3 and 4 illustrate two different designs of sock style filters 10. FIG. 3 shows a sock style filter 10 with the hole in the retainer 16 positioned at the end of the filter and parallel to the longest dimension of the filter. FIG. 4 shows a sock style filter with the hole in the retainer 16 positioned approximately 120 degrees from the position in FIG. 3. When assembled to the fuel pump each filter body will extend into a different direction outwards with respect to the fuel pump retention post.

The location of the extension of the filter body outwards from the retainer 16 (or connector or stack) is fixed with respect to the module can 48 or fuel tank 40 when the fuel pump assembly 44 is assembled into the tank. The filter body is used to suction the fuel from the areas of the module can 48 or fuel tank 40 and for filtering or removing contamination from the fuel. For different sizes and shapes of fuel tanks 40, or different sizes of module cans 48, the dimensional configurations of the filter body may need to extend outwards in another position with respect to the pump post 50.

FIG. 5A through FIG. 27 exhibit various embodiments and variations of the present disclosure. A singular in-tank fuel filter is disclosed that can be assembled in more than one to an infinite number of radial positions/directions with respect to the fuel pump retention post (e.g. post 50 in FIG. 2) to provide multiple locations for the filter body to extend outwards with respect to the module can 48 or the fuel tank 40. While the disclosed filters are generally in the context of fuel filters, the filters can also be used with other in-tank filter systems used for various liquids or fuels, such as (but not limited to) gasoline, diesel, diesel emissions fluid, power steering fluid and hydraulic fluid.

Figure 5A:
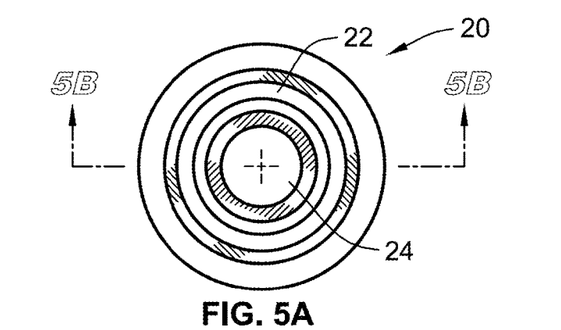
FIG. 5A is a top side detailed sketch of the first exemplary embodiment in accordance with the disclosure.
Figure 5B:
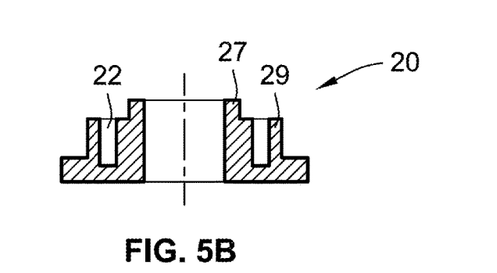
FIG. 5B is a side view detailed sketch of the first exemplary embodiment in accordance with the disclosure.
Figure 5C:
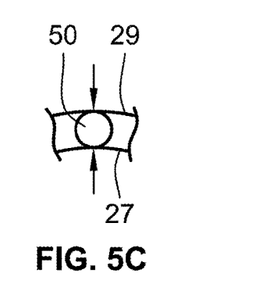
FIG. 5C is a top side detailed sketch of the attachment function of the first exemplary embodiment in accordance with the disclosure.

FIG. 5A, 5B and 5C illustrates a top view, cross-sectional view and a partially cut-away sketch of a first exemplary embodiment of a multipurpose stack filter connector 20. The connector 20 generally includes an outlet 24 and a channel 22. In relation to the prior art designs of FIGS. 1 thru 4, the connector 20 serves the functions of the outlet port 14 and the retainer 16 in the designs of FIGS. 1-4. The connector 20 is attached to a filter body using known techniques, such as the filter body 12 in FIG. 2. The filter body attached to connector 20 may be any in-tank fuel filter now known or developed in the future, and preferably is a sock style filter. FIG. 5C illustrates the engagement of the two walls 27, 29 of the channel 22 in an interference fit to the retention post or pin 50.

Figure 6:
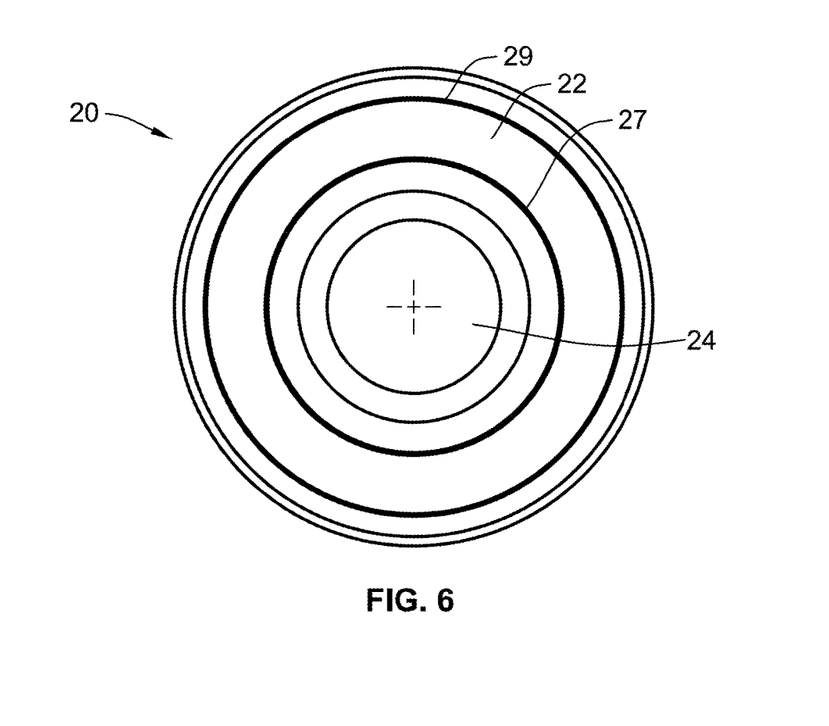
FIG. 6 is a top side view of the first exemplary embodiment in accordance with the disclosure.

FIG. 6 further illustrates the top down view of the connector 20 having an outlet 24 and a channel 22 used for positioning and securing the retention post 50 of the fuel pump 46. The channel 22 is positioned fully around the outlet 24 to provide an interference fit up to the retention post 50 with infinite numbers of positioning locations. Stated another way, the channel 22 is annular (i.e. ring-shaped), and spans 360 degrees. Preferably the channel 22 is circular. The channel 22 includes opposing walls 27 and 29 of the channel that serve to grip and tightly secure the retention post 50. Filter material attached to the connector 20 is not shown for simplicity of the drawings.

Figure 7:
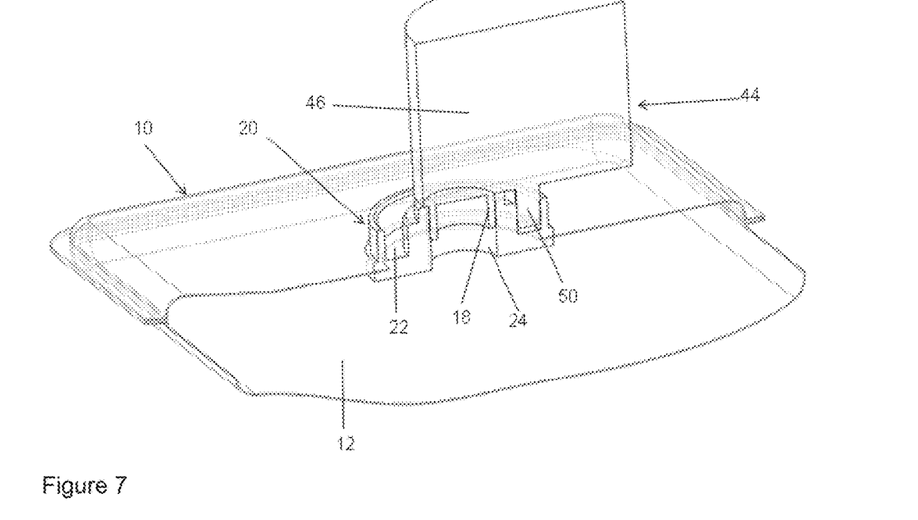
FIG. 7 is a cut away view of the first exemplary embodiment attached to filter body and the pump retention post body.

The cross sectional view of FIG. 7 shows the assembly of the first embodiment of the connector 20 to the inlet fitting 18 (of the pump 46) and the retention post 50. Also shown is the attachment of the connector 20 with the filter 10. The assembly illustrates the retention post 50 and infinite positioning locations by rotating the filter radially. The retention post 50 would be retained in the channel 22 at all infinite positions around the outlet 24.

Figure 8:
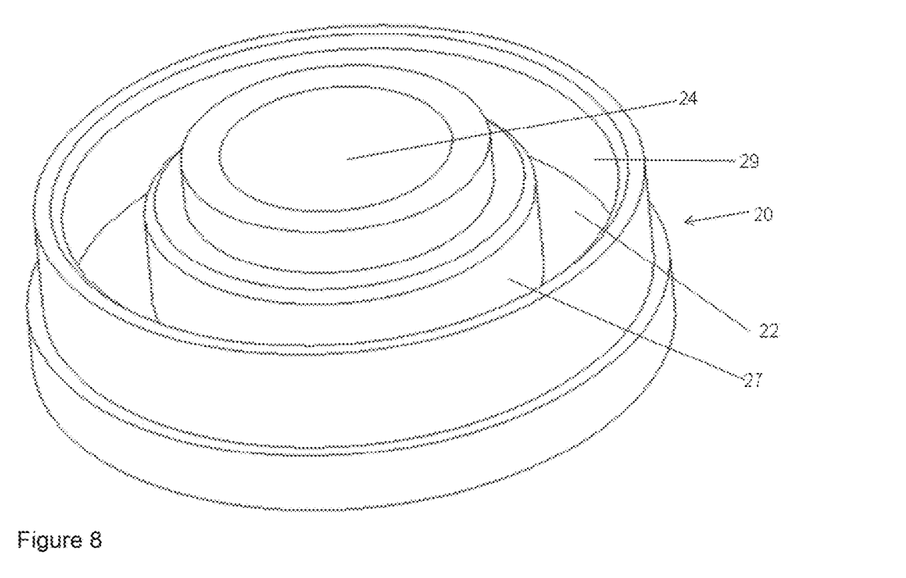
FIG. 8 shows an isometric view of the first exemplary embodiment.

FIG. 8 shows a detailed perspective view of the connector 20 with the channel 22 positioned fully around the outlet 24. The walls 27 and 29 are preferably perpendicular (or co-axial) and with height of 3.0-4.0 mm for gripping of the retention post 50. A minimal chamfer is shown at the upper corner of the walls 27 and 29 as an aid for insertion of the retention post 50 into the channel 22. The retention post 50 is commonly 3.85-3.95 mm diameter and positioned 11.10-11.20 mm from the center of the retention post 50 to the center of the inlet 24. For interference fit, the radial width (a radial distance between walls 27, 29) of the channel 20 is less than the diameter of the retention post 50, for example 3.70-3.75 mm, preferably with an interference fit of 0.1-0.25 mm. The total length of the retention pin 50 is commonly 7.80-8.0 mm. The depth of the channel from the top of the outlet 24 to the bottom of the channel should be 8.0-9.0 mm, deep enough to accept the total length of the retention pin 50. In some implementations a larger retention post may be used by maintaining a similar interference fit with a larger channel width. The effective diameter of the channel is smaller than the effective diameter of the retention pin to ensure the pin is held by friction in the channel. Alternately, the diameter of the channel may have a diameter at the first major surface that is greater than the post diameter and continuously or gradually reduced to the smallest effective diameter less than the post diameter. Filter material attached to the connector 20 is not shown for simplicity of the drawings.

Figure 9:
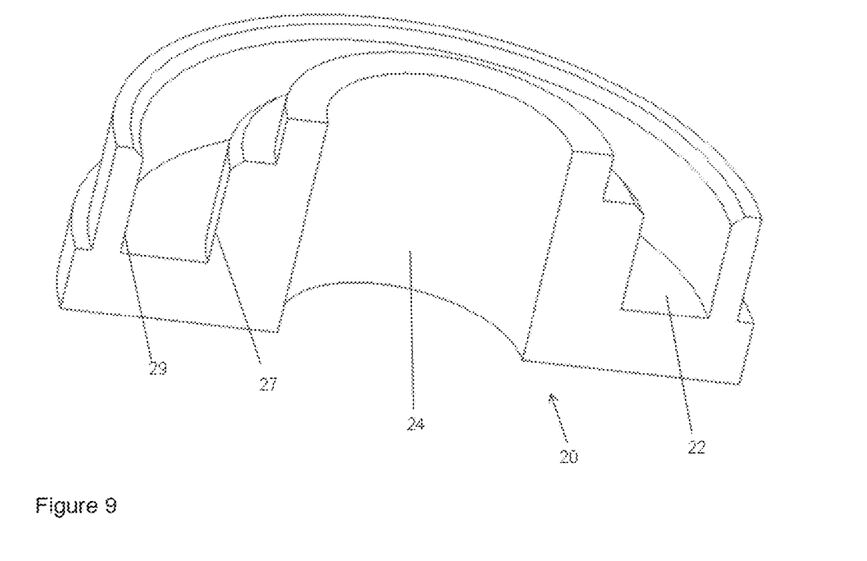
FIG. 9 shows a cut away of the isometric view of the first exemplary embodiment.

FIG. 9 is a cut away of FIG. 8 to show the section details of the walls within the channel 22.

Figure 10:
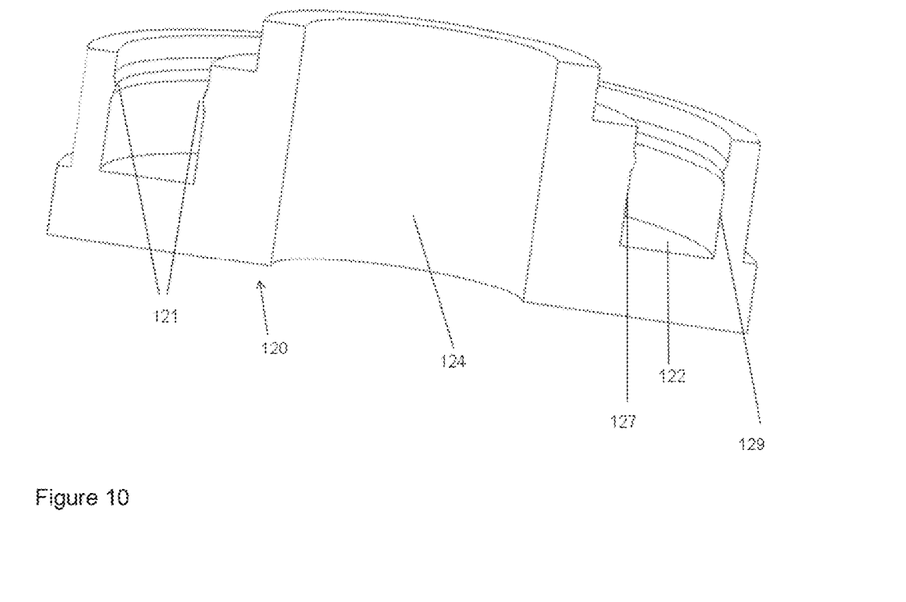
FIG. 10 shows a cut away of the isometric view of the first exemplary embodiment with a retention ridge around the mating surfaces.

FIG. 10 illustrates the connector 120 with an optional feature of a ridge 121 of material protruding radially inward from the inner and outer walls 127 and 129 of the channel 122. This ridge 121 helps to secure and grip the retention post 50 and may be included on one or both side walls of the channel 122. The ridge preferably extends 0.25-1.0 mm from the wall creating a smallest inner diameter of 3.70-3.75 mm for interference fit with the retention post 50. In some implementations a larger retention post may be used with a larger ridge diameter and maintaining a similar interference fit. The effective diameter of the ridge is smaller than the effective diameter of the retention pin to ensure the pin is held by the ridge.

Figure 11A:
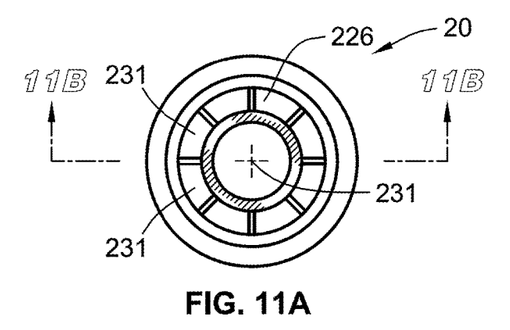
FIG. 11A is a top side detailed sketch of the second exemplary embodiment in accordance with the disclosure.
Figure 11B:
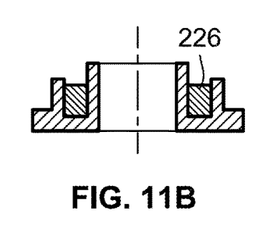
FIG. 11B is a side view detailed sketch of the first exemplary embodiment in accordance with the disclosure.
Figure 11C:
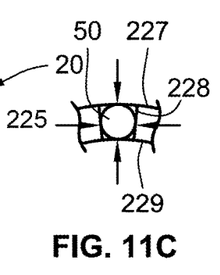
FIG. 11C is a top side detailed sketch of the four wall attachment function of the first exemplary embodiment in accordance with the disclosure.
Figure 11D:
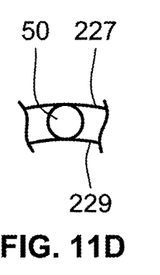
FIG. 11D is a top side detailed sketch of the two wall attachment function of the first exemplary embodiment in accordance with the disclosure.
Figure 12:
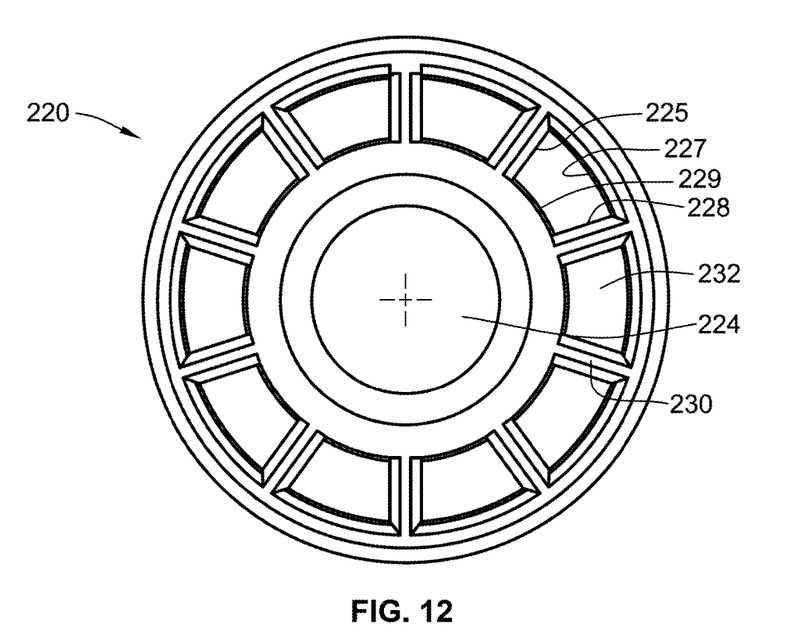
FIG. 12 is a top side view of the second exemplary embodiment in accordance with the disclosure.

FIG. 11A and 11B illustrate a top and cross-sectional sketch of a second exemplary embodiment of a multipurpose stack filter connector 220. This wagon wheel style channel 226 having a plurality of pockets 232 defined by ribs 230 having opposing radial walls 225, 228, provides multiple finite positioning locations for the retention post 50 to provide a locating feature when true positioning of the fuel pump 46 to filter 12 is required. The definition of true positioning is the imaginary perfect position of a feature described by a fuel system design specification. FIG. 11C illustrates the engagement of the four walls 225/227/228/229 of the channel 226 in an interference fit to the retention pin 50. The four walls 225/227/228/229 of the channel 226 are shown in FIG. 12. FIG. 11D illustrates the engagement of the two walls 227 and 229 of the channel 226 in an interference fit to the retention pin 50.

FIG. 12 further illustrates the top down view of the connector 220 with wagon wheel style channel 226. Separating the channel 226 into sections are unitarily molded in ribs 230 that are used to locate and position the retention post 50 into the defined open pockets 232 of the channel 226. Viewed another way, the annular channel 226 of the connector 220 includes a plurality of ribs 230 extending radially across the channel 226 to divide it into discrete, semi-annular, pockets 232 sized to frictionally receive the retention post 50. The ribs 230 may be of various thicknesses, but preferably are 5-20 mm thick and the pockets are preferably 3.25-6 mm long. The pockets 232 may be generally trap-ezoid in shape (FIG. 11C) to secure the retention post 50 on four walls 225/227/228/229 or generally rectangular in shape (FIG. 11D) to secure the retention post 50 on two walls 227/229. Alternately the pockets 232 may be shaped individually as a parallelogram, square, hexagon, octagon, or round, and not depart from the intent of the function of the pocket. For interference fit, the width of the channel 226 is less than the diameter of the retention post 50, for example 3.70-3.75 mm, preferably with an interference fit of 0.10-0.25 mm.

Figure 13:
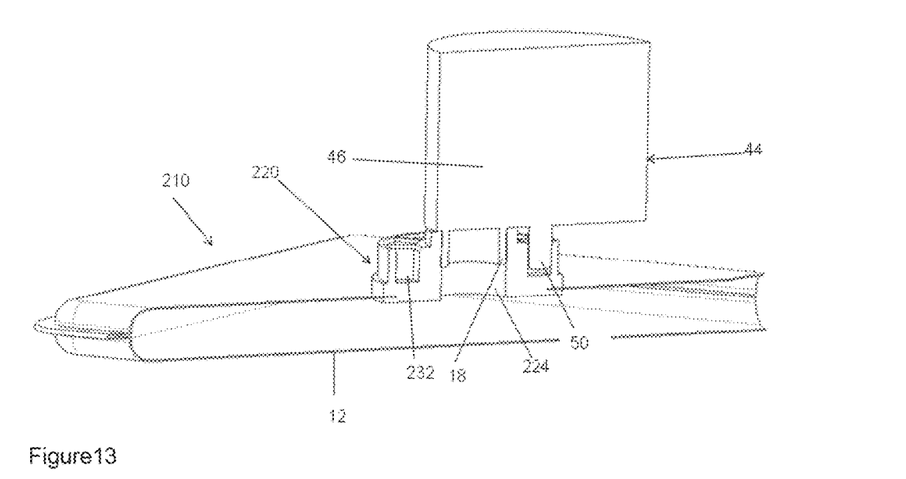
FIG. 13 is a cut away view of the second exemplary embodiment attached to filter body and the pump retention post body.

The cross sectional view of FIG. 13 shows the assembly of the second embodiment of the connector 220 to the inlet fitting 18 and the retention post 50 with the filter 210. The assembly illustrates that the retention post 50 has multiple finite position locations by rotating the filter radially. The retention post 50 would be retained in the pocket 232. FIG. 13 also shows the attachment of filter media 12 to the connector 220.

Figure 14:
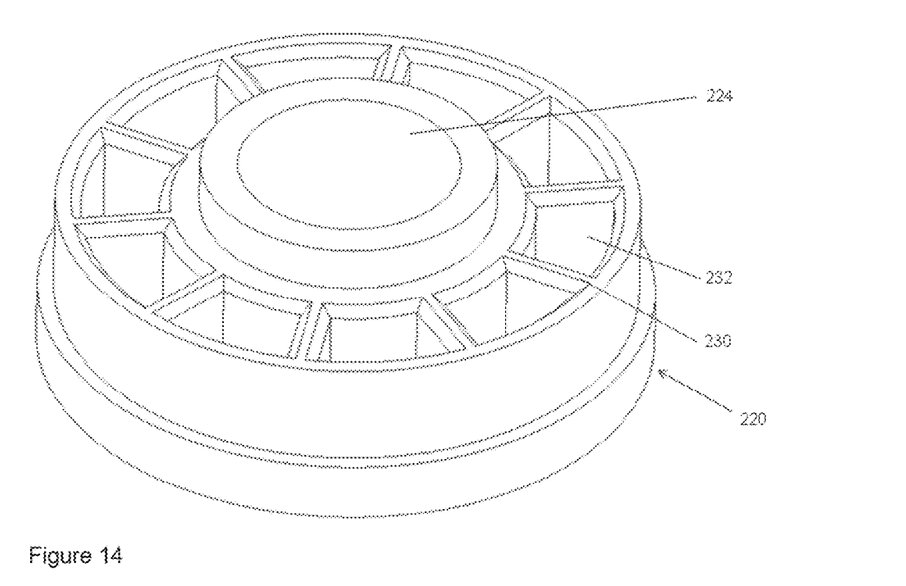
FIG. 14 shows an isometric view of the second exemplary embodiment.
Figure 15:
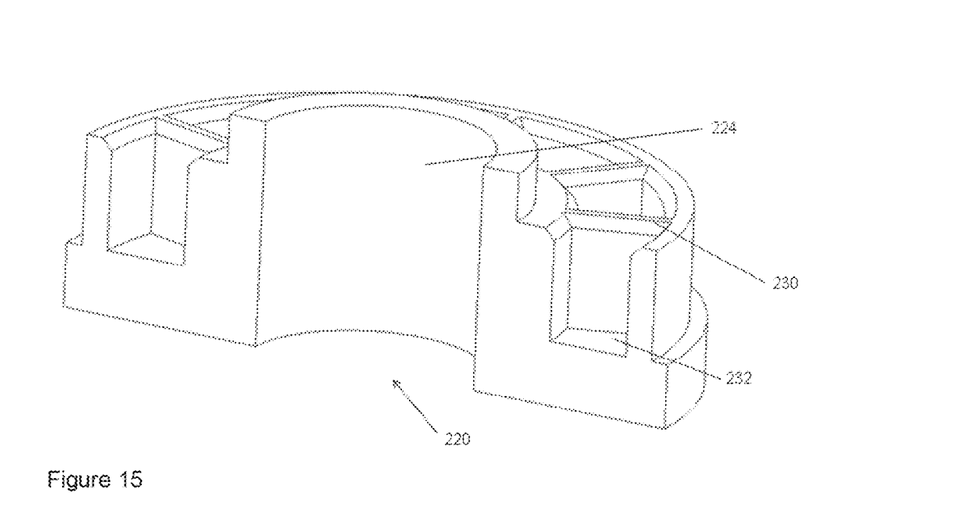
FIG. 15 shows a cut away isometric view of the second exemplary embodiment.

FIG. 14 shows a detailed view of the connector 220 with the channel 226 separated in finite multiple pockets 232 by the unitarily molded in ribs 230 and positioned fully around the outlet 224. Filter material attached to the connector 220 is not shown for simplicity of the drawings. FIG. 15 is a cut away of FIG. 14 to show the sectioning of the channel 226.

Figure 16:
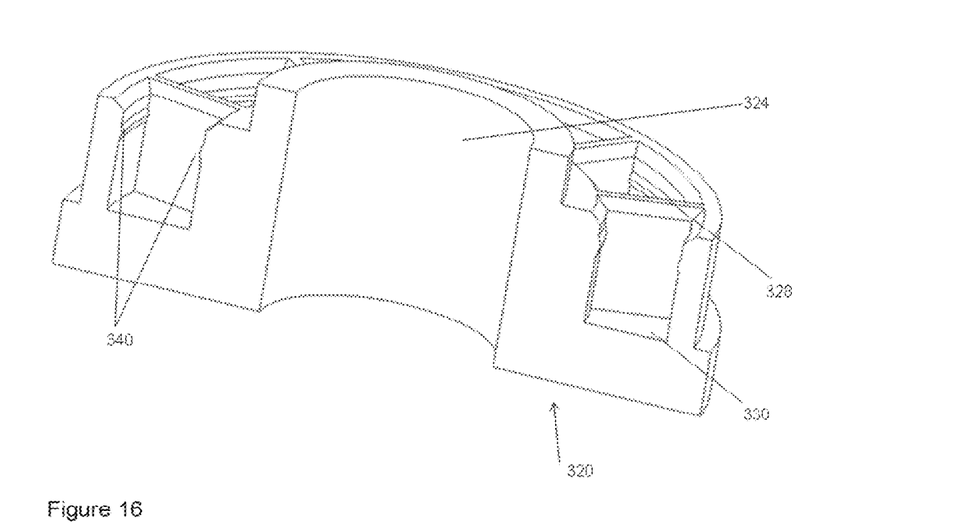
FIG. 16 shows a cut away isometric view of the second exemplary embodiment with a retention ridge around the mating surfaces to the retention post.

FIG. 16 illustrates a connector 320 similar to the connector 220 described above, but with an optional feature using a ridge 340 of material protruding radially inward from the inner and outer walls of the channel. This ridge 340 helps to secure and grip the retention post 50 and may be included on one, two, three or four walls of the pocket 330. The ridge preferably extends 0.25-1.0 mm from the wall creating a smallest inner diameter of 3.70-3.75 mm for interference fit of 0.10-0.25 mm with the retention post 50.

Figure 17:
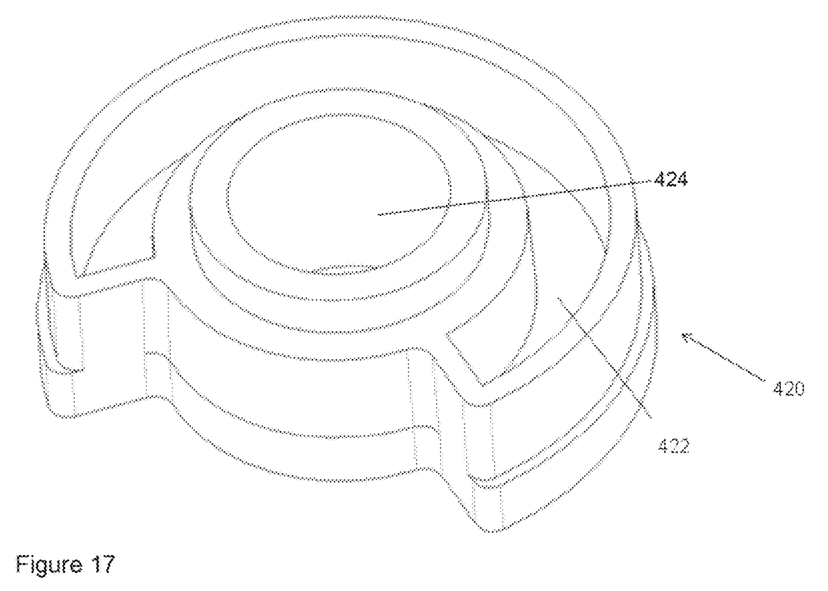
FIG. 17 shows an isometric view of the first exemplary embodiment with the infinite channel completing less than a full radial circle around the inlet.
Figure 18:
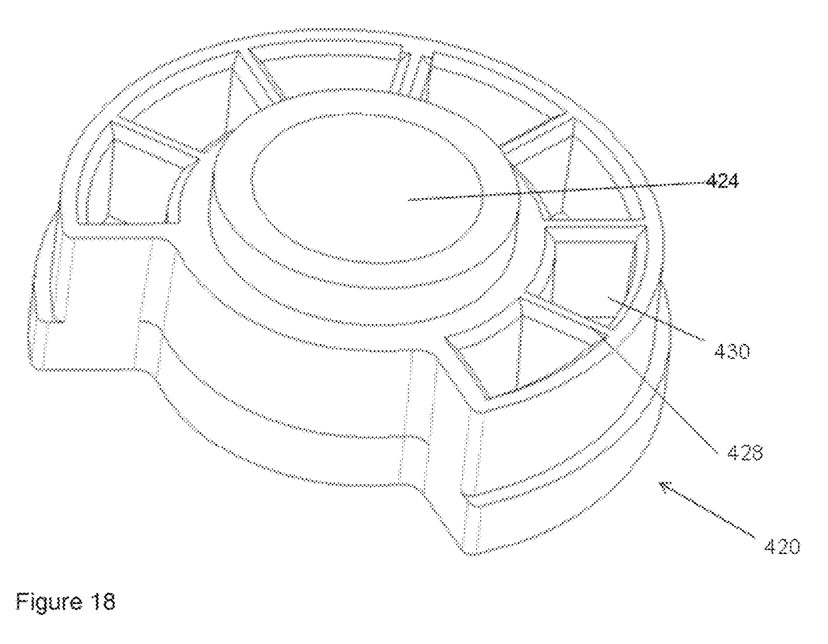
FIG. 18 shows an isometric view of the second exemplary embodiment with the infinite channel completing less than a full radial circle around the inlet.

FIG. 17 and FIG. 18 show additional variations of the earlier embodiments of the invention. These illustrate the option to use a connector 420 having a channel 422 that spans less than 360 degrees around the outlet 24. The channel 422 may span 40 to 360 degrees, and preferably 270 degrees. The channel may be divided into pockets 430 by ribs 428.

For the various embodiments described above and below, the connector 20/120/220/320/420 can be universally used on various fuel pumps with retention post 50 by customized dimensioning of the channel width, channel depth and distance from the channel 22/122/226/422 and the outlet 24/124/224.

Figure 19:
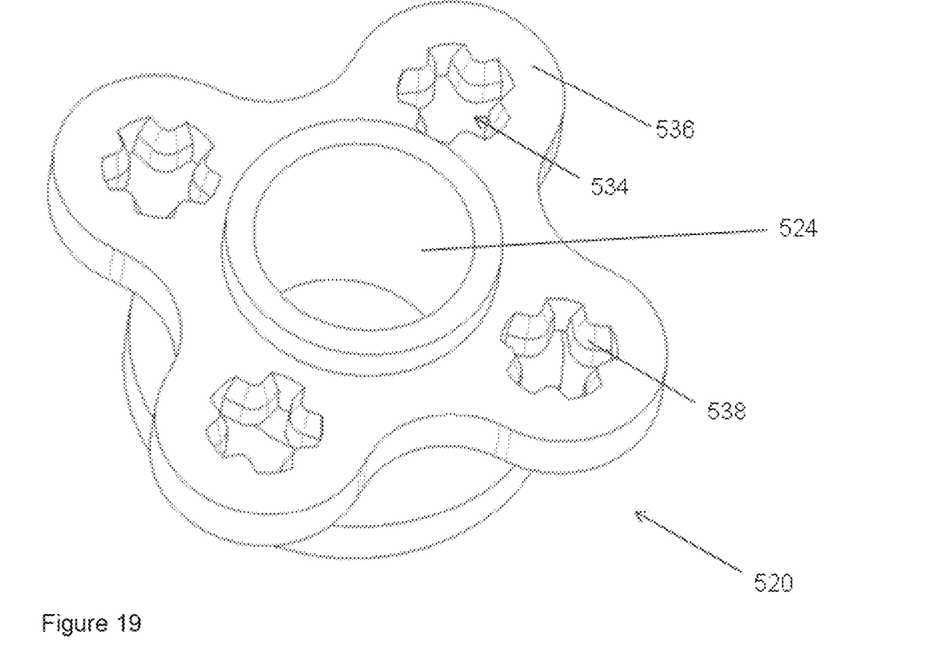
FIG. 19 is an isometric view of the third exemplary embodiment in accordance with the disclosure.

FIG. 19 depicts yet another embodiment of a connector 520 using a tab 536 and a plurality of apertures/retainers 534 to grip the retention post 50. This design provides increased gripping force to hold the retention post 50. The tab 536 has a flower-shape with several petals for each apertured retainer 534. The tab 536 is a planar member extending outwardly from the cylindrical outlet 524 in a plane perpendicular to the flow axis. Inside each aperture 534 are protrusions or lugs 538 that are used for gripping of the retention post 50. Alternately the walls of the aperture may have a funnel-like, for example frustoconical, wall to function as a centering guide at initial post to connector engagement. The design of the aperture is preferably as shown and described in U.S. Pat. No. 8,715,497, which is incorporated herein by reference. Here, the tab 536 is formed around the periphery of the outlet 524 with multiple aperture holes located in multiple radial locations around the outlet 524 for securing to the retention post 50. FIG. 19 shows an example using four retainers 534 located equally spaced around the outlet 524. The location of the retainers can vary at different degree positions around the outlet 524. Any number of discrete equidistant or non-equidistant locations may be used with varying and decreasingly or increasingly spaced distances between retainers 534. Plastic is shown removed in the areas between the retainers 534 on the tab 536 (i.e. forming the petal shape) to reduce the part weight and cost.

Figure 20:
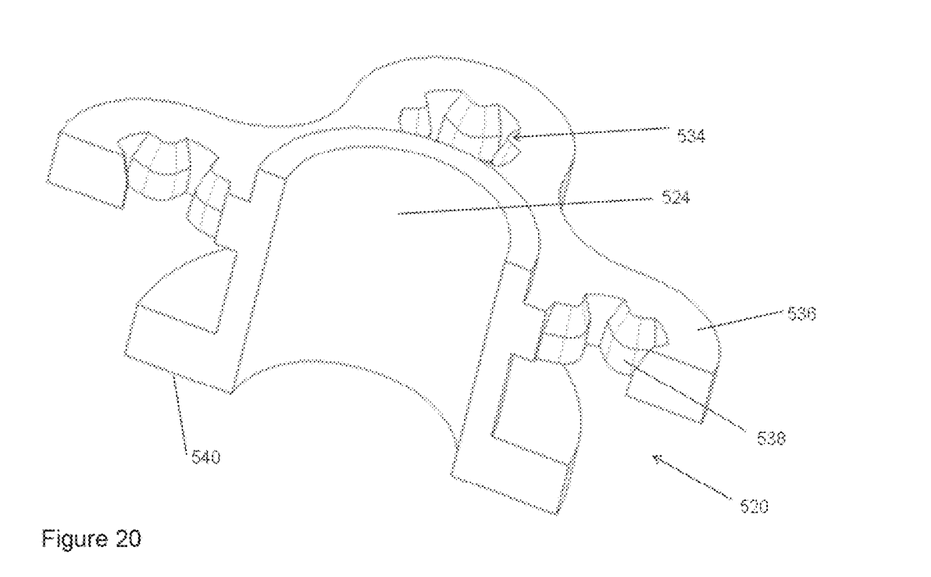
FIG. 20 shows a cut away isometric view of the third exemplary embodiment in accordance with the disclosure.
Figure 21:
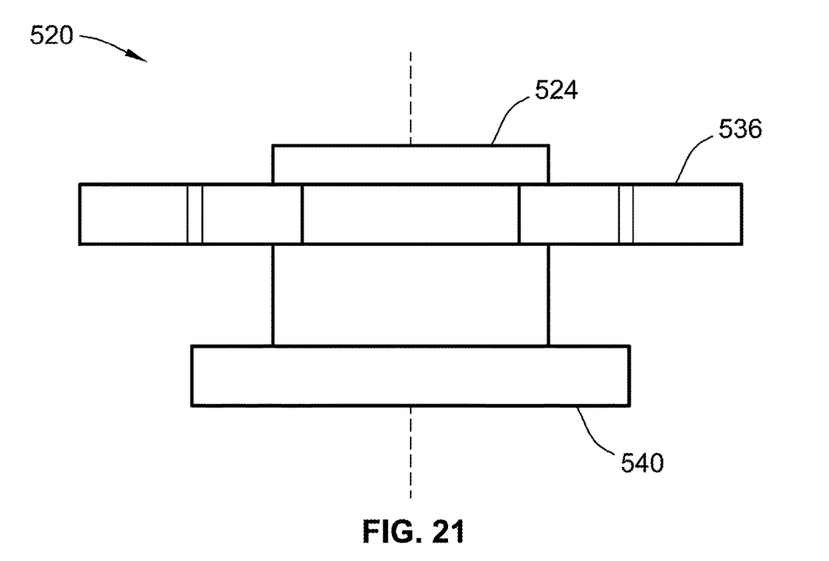
FIG. 21 is a side view of the third exemplary embodiment in accordance with the disclosure.

FIG. 20 shows a cut away isometric view to illustrate the retainer 534 and lugs 538 as positioned on the tab 536. The design and number of lugs 538 of the retainer 534 may be modified in other forms without departing from the function to secure the retention post 50. Filter material would be attached to the base 540 of the connector 520 and is not shown for simplicity of the drawings. The base 540 is a flange or planar member extending outwardly from the cylindrical outlet 524 in a plane perpendicular to the flow axis, and is spaced longitudinally away from the tab 536. FIG. 21 illustrates a side view of this exemplary embodiment of the multipurpose stack filter connector 520 to show the location and positioning of the tab 536 to the outlet 524.

Figure 22:
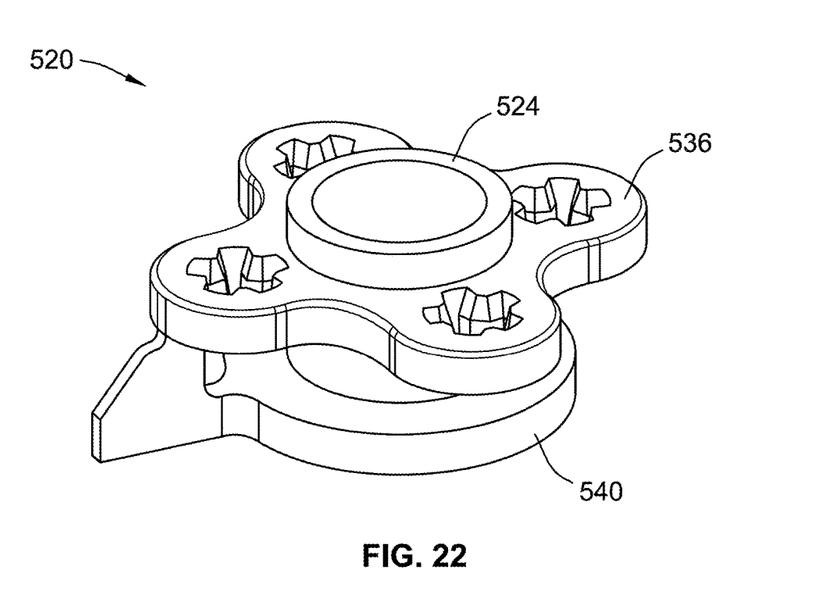
FIG. 22 is an isometric view of the third exemplary embodiment with four aperture hole positions with the anti rotational positioning tab in accordance with the disclosure.
Figure 23:
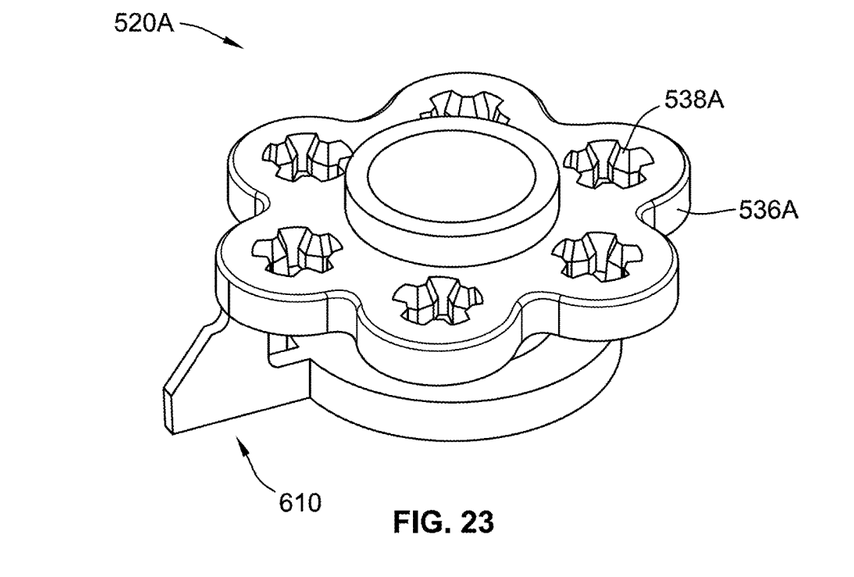
FIG. 23 is an isometric view of the third exemplary embodiment with six aperture hole positions with the anti rotational positioning tab in accordance with the disclosure.

FIG. 22 shows the connector 520 of FIGS. 19-21 with the addition of an anti rotational positioning tab 610 attached to one or more of the base 540, outlet 524 and/or tab 536. FIG. 23 shows a similar connector 520A having a tab 536A with six petals and six aperture retainers 538A. The positioning tab 610 is preferably located in radial alignment with one of the retainers 538/538A (e.g. at an apex of a petal of the tab 536/536A). A bottom surface of the tab 610 is preferably co-planar with the base 540. The outer edge of the tab 610 is tapered such that it projects the furthest from the outlet 524 near the base 540, and the least near the tab 536. Designs using a finite number of aperture holes may require orientation of the aperture holes to the filter body 12. The anti rotational positioning tab 610 is preferably molded onto the stack (e.g. the cylindrical outlet 524 of the connector 520) to provide a means to orient the apertures to the filter body 12 during assembly of the connector 520 to the filter. The anti rotational positioning tab 610 can also be used to lock the filter to an orientation on the fuel pump 46 using a locator on the assembly end of the fuel pump. The locator may be a pin, fin, tab or channel projecting from the fuel pump and sized and positioned to engage the positioning tab 610.

Figure 24:
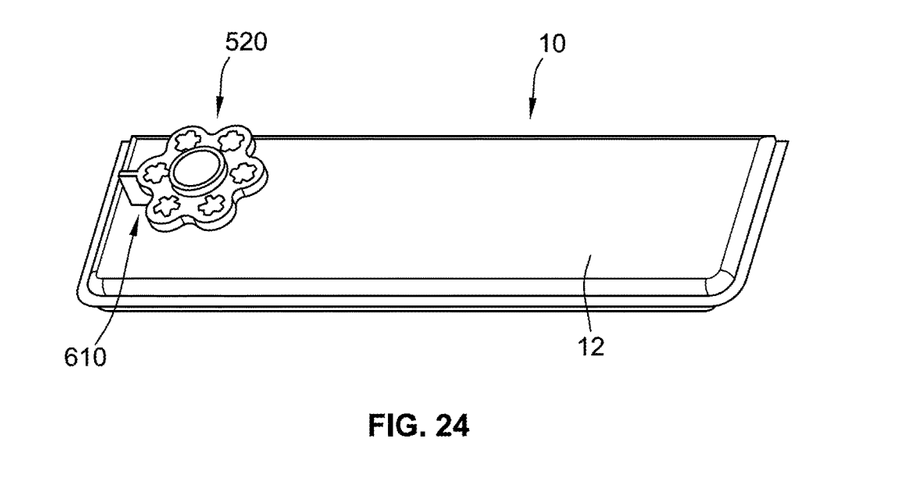
FIG. 24 is is a pictorial view of a sock style filter with the six aperture hole positions and anti rotational positioning tab in accordance with the disclosure.

FIG. 24 shows the sock style filter 10 with the connector 520. In this embodiment the tab is located parallel to direction of elongation of the filter body 12. This one filter 10, for example, can be used in six different configuration of a fuel pump assembly 44 and provide six different locations of the extension of the filter body outwards with respect to the module can 48 or fuel tank 40 when the fuel pump assembly 44 is assembled into the tank.

Figure 25:
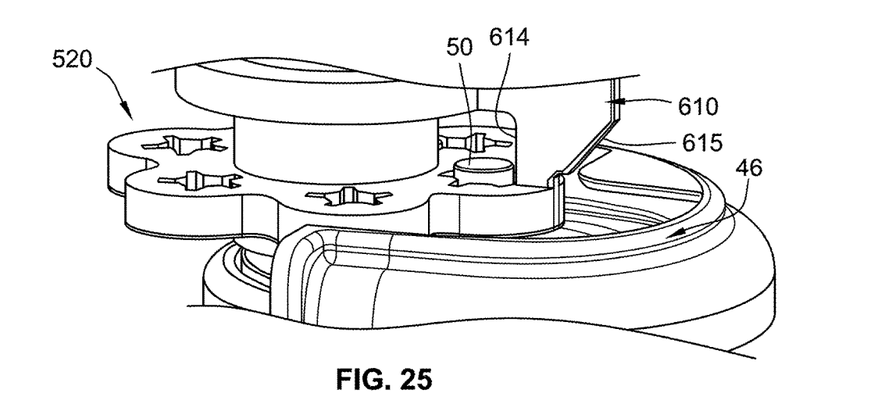
FIG. 25 is a pictorial view of the assembly of the filter stack with anti rotational positioning tab to the retention post of the fuel pump.

The anti rotational positioning tab 610 is designed to allow adequate clearance between the tab and the fuel pump to assemble the filter to the fuel pump as shown in FIG. 25. The inside edge 614 of the anti rotational positioning tab 610 is spaced away from the cylindrical outlet 534 to provide space and clearance for the maximum length of the fuel pump retention post 50. The size and shape of the outside edge 615 of the anti-rotational positioning tab 610 provides clearance for the fuel pump body.

Figure 26:
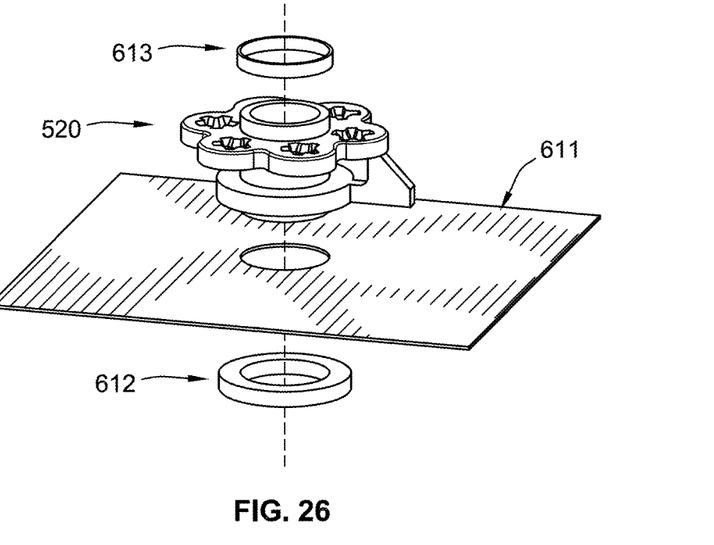
FIG. 26 is a pictorial view of the assembly stack up of the six aperture hole stack to the filter media with an assembly ring and swell ring in accordance with the disclosure.

Assembly of the stack to the filter media can be performed by attaching individual components using known assembling methods such sonic welding, vibration welding, adhesive or other methods known to the art. FIG. 26 shows a representative example of the assembly of the individual components. The connector 520 is placed through a hole in the filter media 611 and an assembly ring 612 is welded to the connector 520 (i.e. stack) to hold the components together. The fuel pump is attached into the inner diameter of the stack. For applications using a retainer 534 made with a material known to swell in fuel, such as Nylon 6, Nylon 6-6, or Nylon 12, a swell ring 613 (e.g. of metal) is assembled around the stack to hold the inside dimension of the stack and keep a tight fit to the fuel pump.

Figure 27:
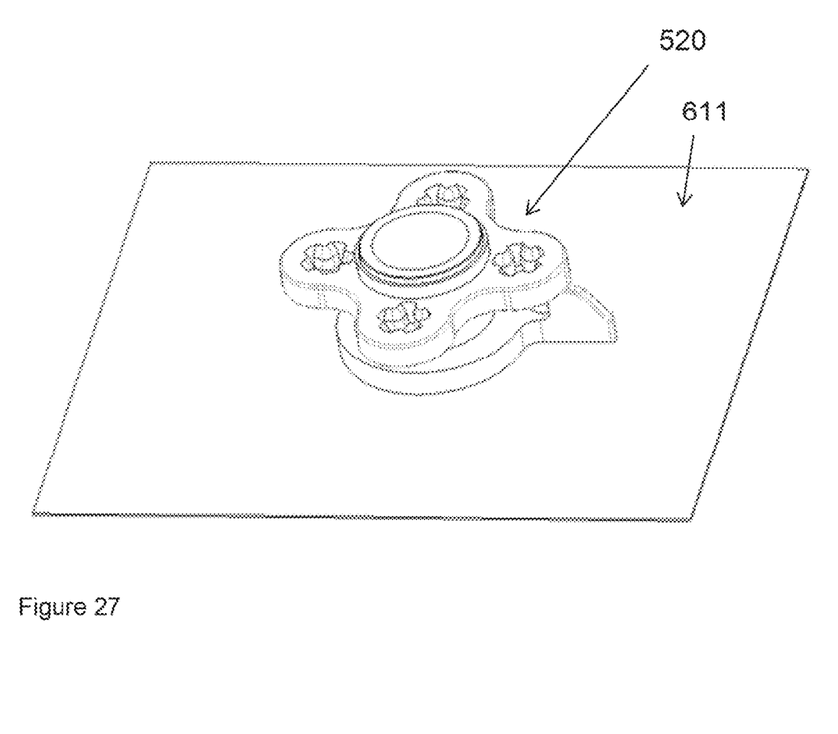
FIG. 27 is a pictorial view of the assembled four aperture hole stack with the anti rotational positioning tab.

Alternately the connector 520 can be molded directly onto the filter media 611 using an insert injection molding process. The assembly of the stack to the filter media is shown in FIG. 27.

The connector 20/220/320/420/520 can be made of any non-metallic material, for example a thermoplastic that is fuel resistant, dimensionally stable in fuel, and that is injection-molded into the desired shape. One example of a suitable plastic material includes, but is not limited to, polyoxymethylene (POM). Glass fibers, stainless steel fibers or glass spheres can be added to the material for structural reinforcement or to increase the rigidity of connector.

The invention may be embodied in other forms without departing from the spirit or novel characteristics thereof. The embodiments disclosed in this application are to be considered in all respects as illustrative and not limiting. The scope of the invention is indicated by the appended claims rather than by the foregoing description; and all changes which come within the meaning and range of equivalency of the claims are intended to be embraced therein.

What is claimed is:

1. A filter for attachment to a pump having an inlet fitting and a retention post with a post cross-section, the filter comprising:
   a filter body made of porous material;
   a plastic connector attached to the filter body and having an outlet port formed therein for connecting the filter to the inlet fitting, the outlet port having a flow axis defined by an intended direction of fluid flow from the filter to the pump; and
   a radial channel formed in the connector for connecting the filter to the retention post, the radial channel spaced radially away from the outlet port and having a radial width smaller than the retention post cross-section;
   wherein the radial channel is formed by an inner wall and an outer wall opposite the inner wall, the inner and outer walls projecting in the direction of fluid flow from a base of the connector, the outer wall having a height relative to the base that is less than a height of the outlet port.

2. The filter of claim 1, wherein the radial channel is unitarily molded in the connector.

3. The filter of claim 1, wherein the radial channel extends uninterrupted around the entire periphery of the outlet port.

4. The filter of claim 1, wherein the radial channel is segmented into sections around the entire periphery of the outlet port.

5. The filter of claim 1, wherein the plastic connector includes an anti-rotational positioning tab projecting radially away from the outlet port.

6. The filter of claim 4, wherein the sections are arcuate.

7. The filter of claim 4, wherein the sections are parallelograms.

8. The filter of claim 1, wherein the radial channel is uninterrupted around only a portion of the outlet port.

9. The filter of claim 1, wherein the radial channel is segmented into aperture sections around a only a portion of the outlet port.

10. The filter of claim 1, wherein the radial channel includes a ridge on one or more walls of the channel for securing a post.

11. The filter of claim 2, wherein the radial channel provides infinite number of post retention locations relative to the flow axis.

12. The filter of claim 3, wherein the radial channel provides infinite number of post retention locations relative to the flow axis.

13. The filter of claim 4, wherein the sections in the radial channel provide a finite number of post retention locations relative to the flow axis.

14. A filter for attachment to a pump inlet fitting and retention post with a post cross section, the filter comprising:
    a filter body made of porous material;
    a plastic outlet port attached to the filter body for connecting the filter to the inlet fitting, the outlet port having a flow axis defined by an intended direction of fluid flow from the filter to the pump; and
    a plastic retainer formed on the outlet port, the retainer comprising a tab extending in a plane perpendicular to the flow axis, the tab having a first surface facing the pump and a second surface facing away from the pump;
    wherein the tab includes at least two apertures located radially around the outlet port for receiving the retention post, the apertures extending from the first surface to the second surface, the apertures having an effective cross-section smaller than the retention post cross-section in at least one radial plane intersecting with the flow axis between the first and second surfaces including the second surface;
    wherein the tab has a flower shape defining a plurality of petals, each petal containing one of the apertures.

15. The filter of claim 14, wherein the tabs are continuously located around the entire periphery of the outlet port.

16. The filter of claim 14, wherein the tab is segmented into two or more aperture holes around the periphery of the outlet port.

17. The filter of claim 14, wherein the aperture holes include lugs for securing a post.

18. The filter of claim 14, wherein the filter provides a finite number of post retention locations relative to the flow axis.

19. The filter of claim 14, wherein the plastic connector includes an anti-rotational positioning tab projecting radially outwardly from the outlet port;
    the tab oriented in a radial plane that is parallel to the flow axis.

20. The filter of claim 1, wherein the inner wall also defines the outlet port.

* * * * *